May 15, 1962 D. R. CLEMINSHAW 3,035,160

REMOTE CONTROLLED SPOTLIGHT

Filed Jan. 25, 1960 5 Sheets-Sheet 1

INVENTOR.
DOUGLAS R. CLEMINSHAW
BY Richard von K. Bruns
Atty.

REMOTE CONTROLLED SPOTLIGHT

Filed Jan. 25, 1960

*INVENTOR.*
DOUGLAS R. CLEMINSHAW
*BY* Richard von K. Bruns
Atty.

INVENTOR.
DOUGLAS R. CLEMINSHAW
BY Richard von K. Brune
Atty.

May 15, 1962 D. R. CLEMINSHAW 3,035,160

REMOTE CONTROLLED SPOTLIGHT

Filed Jan. 25, 1960 5 Sheets-Sheet 4

INVENTOR.
DOUGLAS R. CLEMINSHAW
BY Richard von K. Burns
Atty.

REMOTE CONTROLLED SPOTLIGHT

Filed Jan. 25, 1960 5 Sheets-Sheet 5

INVENTOR.
DOUGLAS R. CLEMINSHAW
BY Richard von K. Bruna
Atty.

3,035,160
Patented May 15, 1962

3,035,160

REMOTE CONTROLLED SPOTLIGHT

Douglas R. Cleminshaw, Syracuse, N.Y., assignor to R. E. Dietz Company, Syracuse, N.Y., a corporation of New York Filed Jan. 25, 1960, Ser. No. 4,405
4 Claims. (Cl. 240—4.2)

This invention relates generally to control systems, and has particular reference to an improved control system for adjusting the angular position of a pivotally mounted device such as a vehicle spotlight, rear view mirror, or the like.

Briefly stated, the invention contemplates a vehicle spotlight or spotlight and rear view mirror combination which is mounted at some point on the exterior of the vehicle for rotational movement about both a horizontal and vertical axis, or about any other pair of non-colinear axes; and it is a general object of the invention to provide an improved arrangement for permitting adjustment of the angular position of the light at a point located at some distance therefrom as, for example, in the interior of the vehicle within easy reach of the operator. In the arrangement to be disclosed, electrical control means are employed with a pair of independent motors being provided in the spotlight assembly for producing rotational movement of the light about the two non-colinear axes, whereby the need for complicated clutch mechanisms or the like is eliminated and simultaneous movement relative to the two axes is permitted.

In addition to the general object stated above, another important object of the invention is to provide an improved control system for adjusting the angular position of a pivotally mounted device wherein the device is provided with a unique structural arrangement for facilitating the assembly and disassembly thereof.

A further important object of the invention is to provide a control system of the above type wherein the angular adjustment of the device about either of its pivotal axes may be effected by a single control switch located conveniently to the operator.

Still another important object of the invention is to provide a control system of the above type which is positive in action and positively holds the device in its adjusted position.

A still further important object of the invention is to provide a control system of the above type which is adapted for use on almost any type or model of vehicle, and is relatively simple to install in the vehicle.

A more specific object of the invention is to provide an improved control system for adjusting the angular position of a pivotally mounted device which includes means for preventing injury to the motors or drive trains in the event that the device is forcibly moved by a tamperer.

Other objects and advantages of the invention will become apparent from the following detailed description thereof read in conjunction with the accompanying drawings which illustrate a representative embodiment of the invention for the purpose of disclosure.

Figures 1, 2, 3:
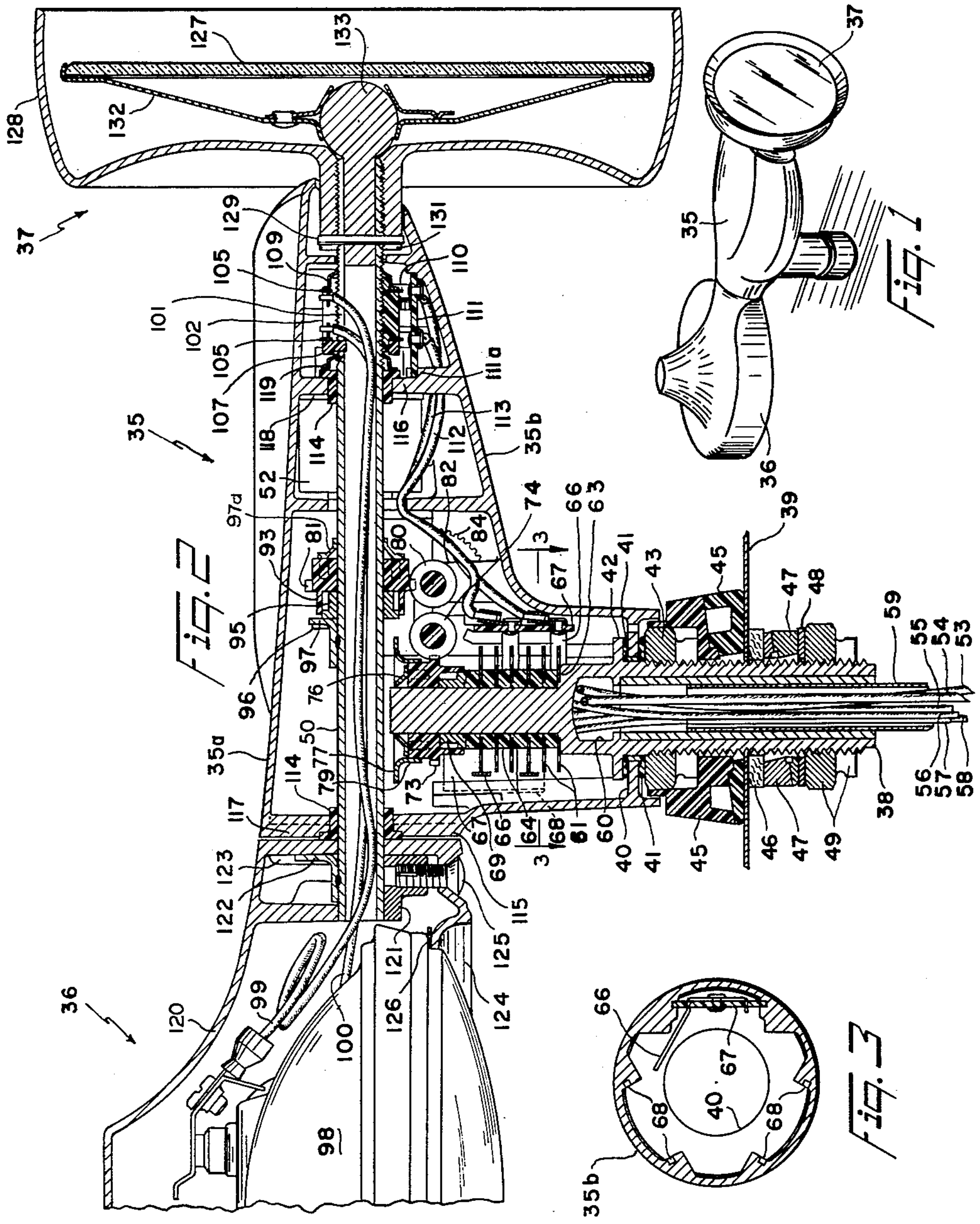
FIGURE 1 is a diminutive perspective overall view of a combination searchlight-rear view mirror assembly embodying the invention.
FIGURE 2 is a fragmentary longitudinal vertical section through the assembly.
FIGURE 3 is a horizontal section taken substantially along line 3—3 of FIGURE 2, with the support shaft and related parts omitted for clarity.

Referring now to the drawings, wherein like reference numbers designate the same part in each of the views, FIGURES 1 and 2 illustrate an assembly for mounting on the exterior of an automotive vehicle, boat or the like, which assembly is essentially comprised of a motor housing 35, spotlight unit 36 and rear view mirror unit 37. While both a spotlight and rear view mirror are shown in the embodiment of the invention to be described, it should be understood that the invention is just as applicable to an assembly having only one of these units, or can be utilized for the remote control of some other type of rotatably mounted device, as for example, a television antenna.

Figure 7:
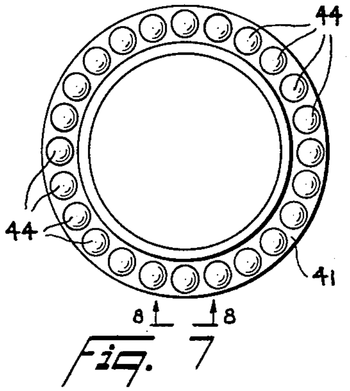
FIGURE 7 is an enlarged plan view of the support shaft thrust bearing.
Figure 8:
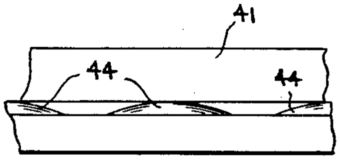
FIGURE 8 is a fragmentary detailed view of the thrust bearing looking in the direction of arrows 8—8 on FIGURE 7.

The motor housing 35 comprises separable upper and lower portions 35*a*, 35*b*, and the entire housing together with the spotlight and mirror is rotatably mounted on a support or mounting shaft 38 shown in FIGURE 2. Since the illustrated arrangement is particularly adapted to be mounted on the fender 39 of an automotive vehicle, the support shaft is disposed in a substantially vertical position and the entire searchlight assembly is rotatable in a substantially horizontal plane around the shaft. To this end, the shaft passes through a central hole in the bottom wall 40 of the lower motor housing 35*b*, and a portion of this bottom wall adjacent the central hole is engaged by a pair of annular thrust bearings 41, FIGURES 2, 7 and 8, which are positioned between a flange 42 on the shaft and a lock nut 43 threaded onto the shaft below the flange. The thrust bearings 41 are preferably made of nylon and the bearing surfaces thereof are provided with a plurality of circumferentially disposed projections 44 in the form of spherical segments for reducing the contact area and thus the friction between the bearings and bottom wall. The fit between the thrust bearings and bottom wall is controlled by the lock nut 43 which is adjusted on the support shaft so that the housing can turn freely and still receive good lower end support.

Below the lock nut 43, the support shaft 38 is encircled by a pair of complementary wedge shaped mounting sleeves 45 which can be adjusted relative to one another to compensate for any curvature in the fender 39 or other mounting surface. Below the mounting surface, the support shaft is encircled by a felt mounting washer 46, a pair of wedge shaped mounting washers 47, a plain mounting washer 48 and a second lock nut 49. After adjustment of the mounting washers 47, the nut 49 is tightened to rigidly secure the support shaft to the mounting surface.

Figure 5:
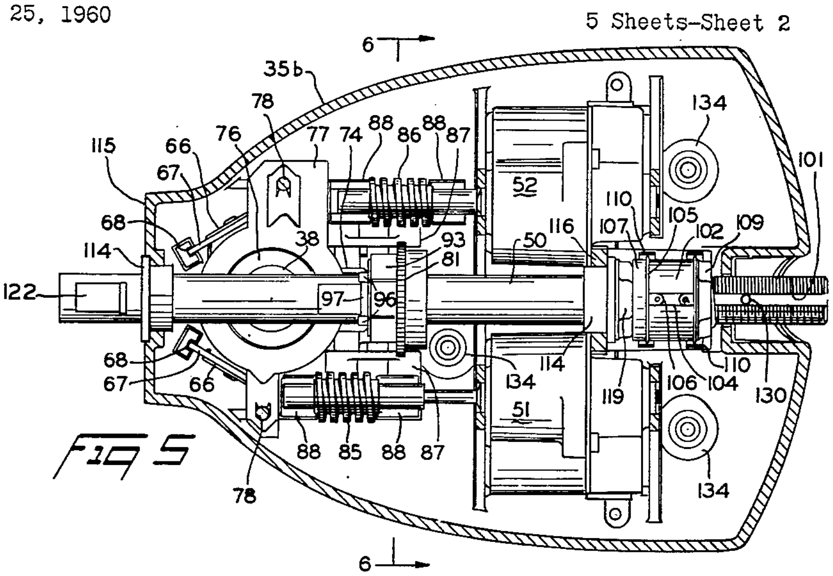
FIGURE 5 is a plan view corresponding to FIGURE 4 showing the motors and upper drive components mounted in position therein.

The spotlight and mirror units 36, 37 are fixed in a manner to be described on the opposite ends of a hollow shaft 50 which extends longitudinally through the motor housing 35 as shown in FIGURES 2 and 5. The shaft 50 is rotatably supported in the housing and its axis is perpendicular to the axis of support shaft 38 so that it lies in a substantially horizontal plane in the illustrated embodiment of the invention. A pair of motors, 51, 52 are mounted in the housing on either side of the shaft 50, and one of these motors operates to drive the shaft 50 while the other motor operates to drive the motor housing around the support shaft.

Figure 10:
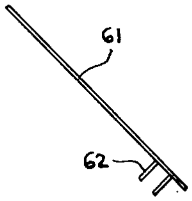
FIGURES 9 and 10 are enlarged plan and side elevational views respectively of one of the electrical contact rings for the assembly.
Figure 9:
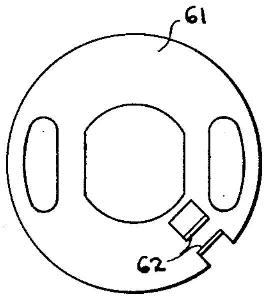

Current for the motors 51, 52 and the lamp of the spotlight unit is delivered to the motor housing by means of six insulated conductors 53–58 that are enclosed in a vinyl sleeve 59. The conductors and sleeve extend upwardly through the hollow lower portion of the support shaft 38 to a point above the flange 42 where the conductors leave the shaft through side openings 60. Within the housing, each conductor is connected to a shaft mounted contact ring 61, FIGURES 2, 9 and 10, by means of tabs 62 formed on the rings.

Figure 11:
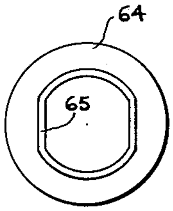
FIGURES 11 and 12 are enlarged plan and side elevational views respectively of one of the contact ring spacers.
Figure 12:
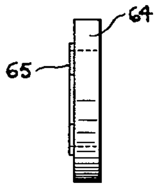

The portion of the support shaft above the side openings 60 has a reduced diameter and is formed with a pair of diametrically opposed flats (not shown). The lowest contact ring rests on a shoulder 63 formed by the reduced diameter of the shaft, and is spaced from the next ring above by a spaced ring 64 of insulating material, FIGURES 2, 11 and 12. The succeeding contact rings are also separated from one another by insulating spacer rings 64, the latter being formed with raised shoulders 65 adjacent their shaft holes to prevent contact of the rings with the shaft, cf. FIGURES 2, 9 and 11.

Since the support shaft 38, conductors 53–58 and contact rings 61 are all fixed relative to the mounting surface 39, the rotatable motor housing is provided with contact ring engaging fingers or brushes 66 to transmit the current from the rings to the motors and lamp. These fingers are mounted in groups of two each on three insulating boards 67 which are spaced around the contact rings as indicated in FIGURES 2–5, each board being held in substantially upright position by a pair of confronting, edge engaging grooves 68 formed in the body of the lower motor housing **35*b*. The contact fingers 66 and boards 67 are arranged so that, if it is assumed that the contact rings are numbered 1 to 6 from the bottom to top, the two fingers on one board will contact rings 1 and 4, the fingers on the next board will contact rings 2 and 5, and the fingers on the last board will contact rings 3 and 6. With this arrangement, the two conductors 53, 54 for the lamp, for example, will be connected to rings 1 and 4, the conductors 55, 56 for one of the motors to rings 2 and 5, and the conductors 57, 58 for the other motor to rings 3 and 6**.

Figure 13:
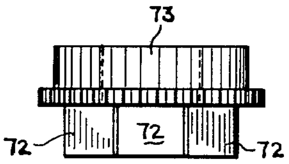
FIGURES 13 and 14 are enlarged side elevational and bottom plan views respectively of the output worm wheel.
Figure 14:
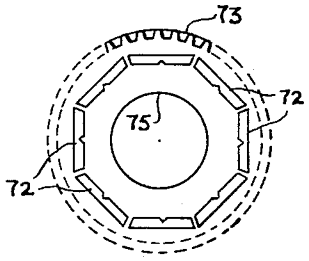
Figure 15:
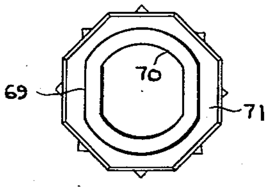
FIGURE 15 is an enlarged top plan view of the support shaft detent.
Figure 16:
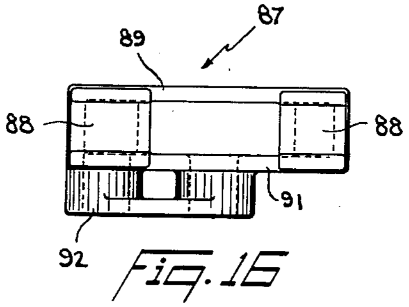
FIGURES 16, 17 and 18 are enlarged top plan, front elevational and side elevational views respectively of one of the intermediate bearing blanks.
Figure 17:
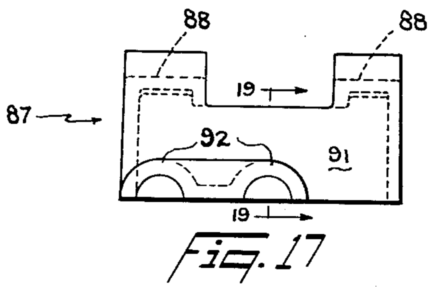
Figure 18:
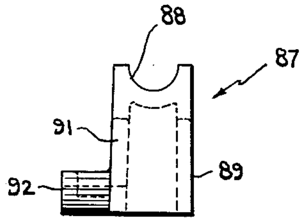
Figure 19:
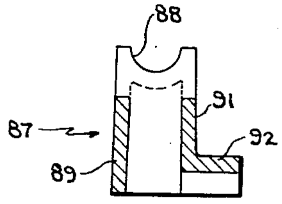
FIGURE 19 is a transverse vertical section through the bearing block taken substantially along line 19—19 of FIGURE 17.

Mounted above the uppermost insulating spacer ring 64 on the support shaft 38 in a metal shaft detent element 69, FIGURES 2 and 15, the shaft hole 70 of which is flatted on opposite sides so that the detent, like the contact and spacer rings, is prevented from turning on the shaft. This detent is provided with an octagonal lower flange 71, the flat sides of which are engaged by complementary depending fingers 72 on a worm wheel 73, FIGURES 2, 13 and 14. The worm wheel meshes with a worm 74 which operates to drive the motor housing around the support shaft in a manner to be presently described. The worm wheel is preferably formed of nylon or an equivalent material, and is provided with a round shaft hole 75 so that it could turn relative to the support shaft except for the engagement of its depending fingers 72 with the flat sides of the detent flange 71. This manner of mounting the worm wheel on the shaft is important because it eliminates the possibility of damage to the teeth of the worm wheel and worm in the event that the housing is forcibly rotated by a tamperer. Thus, in such event, the nylon fingers 72 are sufficiently resilient to spring outwardly and pass around the corners of the octagonal detent flange thereby permitting the forced relative movement to occur between the worm wheel and support shaft rather than between the worm wheel and worm.

The worm wheel 73, detent 69 and contact and spacer rings 61, 64 are maintained in position on the support shaft by means of a conventional pushnut 76 which is mounted on the upper end of the shaft and bears against the upper side of the worm wheel. A bearing plate 77, FIGURES 2 and 5, is also located adjacent the upper end of the support shaft to provide an upper bearing support for the housing, the plate being connected to pin projections 78 in the lower housing **35*b* and being formed with a central opening having a depending peripheral flange 79** which engages the upper cylindrical surface of the worm wheel with a free fit.

Figure 4:
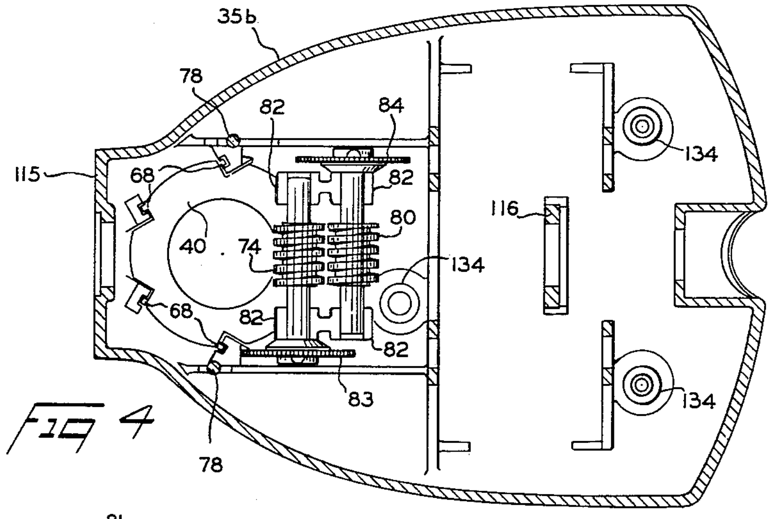
FIGURE 4 is a plan view of the lower portion of the motor housing.

Mounted in parallel relation to the worm 74 which meshes with worm wheel 73 is another worm 80, FIGURES 2 and 4, which meshes with a worm wheel 81 on the hollow shaft 50, the worm wheel 81 being identical in construction and interchangeable with worm wheel 73. Worms 74 and 80 are also preferably of nylon and are integral with their shaft ends which are supported by bearing blocks 82 forming a part of the lower housing **35*b*. As is best shown in FIGURE 4, a worm wheel 83 is fixed on one end of the shaft for worm 74 and a worm wheel 84 is fixed on the opposite end of the shaft for worm 80, the wheels 83 and 84 thus being located on the opposite sides of the shaft 50**.

Figure 6:
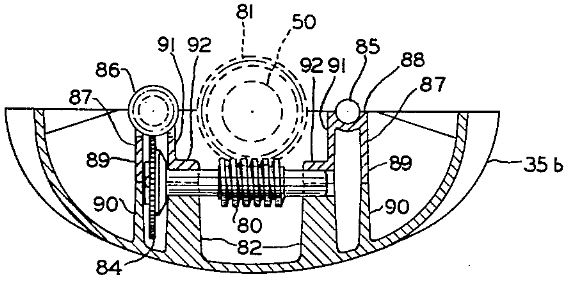
FIGURE 6 is a transverse vertical section taken substantially along line 6—6 of FIGURE 5.
Figure 20:
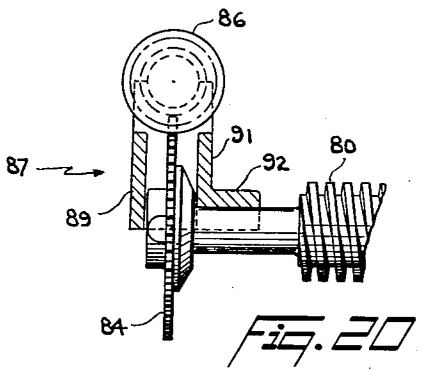
FIGURE 20 is a section corresponding to FIGURE 19 showing the relationship between the drive train for one of the motors and the bearing block.

Worm wheels 83, 84 are engaged by a pair of longitudinally extending superimposed worms 85 and 86, FIGURES 5 and 6, the shafts of which are respectively connected to the shafts of the motors 51 and 52, the motor 51 having a longer shaft than the motor 52 as indicated in FIGURE 5. Bearing support for the shafts of worms 85 and 86 is provided by a pair of intermediate bearing blocks 87, FIGURES 5, 6 and 16–20, which blocks overlie the shaft ends of lower worms 74 and 80 and are provided with spaced semi-cylindrical bearing cradles 88 in which the ends of the shafts of the upper worms 85 and 86 are received. To this end, each bearing block has the general form of an open bottomed rectangular box, the outer side wall 89 of which rests on an upwardly projecting wall 90 in the lower housing **35*b* as is best shown in FIGURE 6. The inner side wall 91 of each bearing block is formed with a pair of semi-cylindrical projections 92, the lower edges of which rest on the upper edges of the bearing blocks 82 for the shafts of the lower worms 74 and 80, FIGURES 4–6, so that the projections overlie and enclose the upper halves of the worm shafts. The worm wheels 83 and 84 on the ends of these worm shafts are thus positioned between the side walls of the bearing blocks as shown in FIGURE 6 and 20, and in between the bearing cradles 88 for the upper worms 85 and 86** the tops of the bearing blocks are open to permit engagement of the upper worms with the worm wheels.

The motors 51, 52 are 6 or 12 volt depending upon the application of the invention, and current is supplied to each motor by means of a pair of insulated conductors (not shown) which are connected to one of the pairs of contact fingers 66 mounted on an insulating board 67. For example, the conductors for motor 51 may be connected to the fingers that engage contact rings 2 and 5 while the conductors for motor 52 may be connected to the fingers that engage contact rings 3 and 6, the relationship between the fingers 66 and contact rings having been previously described.

When, by the operation of a special switch to be made the subject of a separate application by the inventor herein, current is supplied to contact rings 2 and 5, motor 51 is actuated and drives the motor housing (including the spotlight and mirror units) around the fixed support shaft 38 through the drive train comprising the upper worm 85, worm wheel 83, lower worm 74 and the shaft mounted worm wheel 73. Similarly, when current is supplied to contact rings 3 and 6, motor 52 is actuated and drives the shaft 50 (independently of the position of the housing) through the drive train comprising upper worm 86, worm wheel 84, lower worm 80 and the shaft mounted worm wheel 81. Current can also be supplied to both motors at the same time to effect rotation of the spotlight and mirror units around the vertical and horizontal axes of shafts 38 and 50 simultaneously.

In connection with the foregoing, it should be pointed out that the worm wheel 81 is mounted on shaft 50 in substantially the same manner as worm wheel 73 is mounted on support shaft 38 so that there will be no possibility of damage to the drive train for shaft 50 in the event that someone attempts to rotate the searchlight about its horizontal axis by means of externally applied force. As previously noted, the worm wheel 81 is identical in all respects to worm wheel 73, and the octagonally disposed fingers 93 thereof engage the sides of an octagonal flange 94 on a detent 95, FIGURES 2, 21, 29 and 30, the detent 95 having substantially the same configuration as the support shaft detent 69. However, since the shaft 50 is cylindrical throughout, the detent 95 is prevented from rotating on the shaft by being provided with a pair of spaced upstanding ears or lugs 96 which straddle the upstanding leg 97 of a small L-shaped bracket that is secured to the shaft as by spot welding, see FIGURES 2, 5 and 21. The worm wheel 81 is held against longitudinal movement on the shaft 50 by means of a palnut 97*a*, FIGURES 2 and 21.

Figure 21:
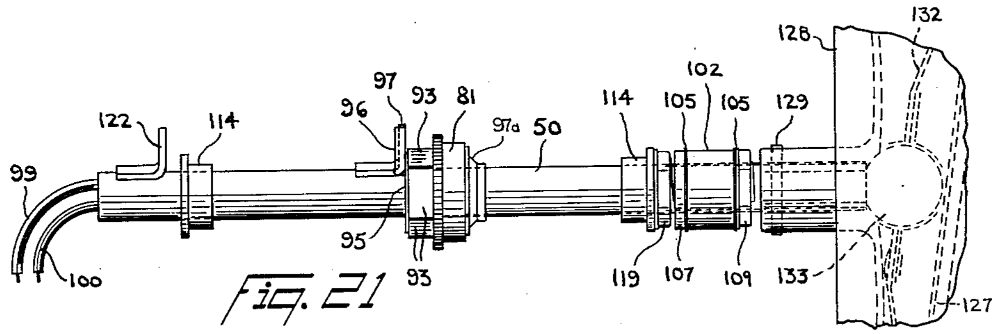
FIGURE 21 is an enlarged side elevation of the lamp shaft sub-assembly.
Figure 22:
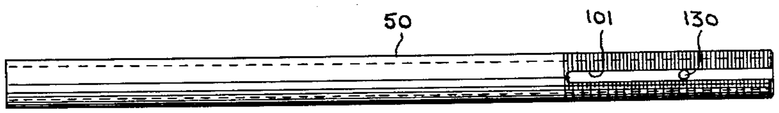
FIGURE 22 is a top plan view of the lamp shaft.
Figure 23:
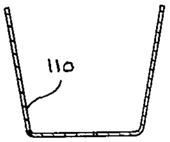
FIGURE 23 is a side elevation of one of the lamp shaft contact fingers.
Figure 24:
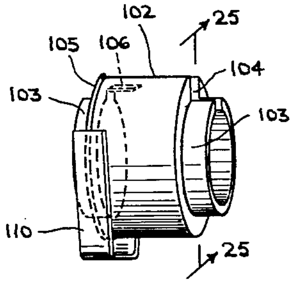
FIGURE 24 is an enlarged perspective view of the lamp shaft contact ring insulator, showing the relation of one of the contact rings and contact fingers thereto.
Figure 25:
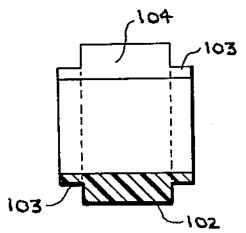
FIGURE 25 is a longitudinal vertical section through the contact ring insulator taken substantially along line 25—25 of FIGURE 24.
Figure 26:
FIGURES 26 and 27 are enlarged side and front elevations respectively of a lamp shaft contact ring.
Figure 27:
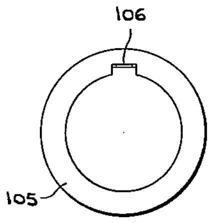

Current is delivered to the lamp 98 of the searchlight unit by means of a pair of insulated conductors 99, 100 which pass through the hollow shaft 50 and terminate at a slot 101 formed in the shaft at the mirror end thereof, FIGURES 2 and 22. Mounted on the shaft at this point is a cylindrical insulating sleeve 102, FIGURES 2, 21, 24 and 25, having end portions 103 of reduced diameter and a longitudinal cut 104 in its wall which registers with the shaft slot 101. A pair of contact rings 105 having a slightly larger outer diameter than that of the insulating sleeve are mounted on the reduced end portions of the sleeve, the rings being formed with projecting tabs 106 that extend into the sleeve cut 104 and to which the conductors 99, 100 are connected.

Figure 28:
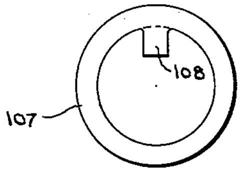
FIGURE 28 is an enlarged front elevation of the insulating washer.
Figure 29:
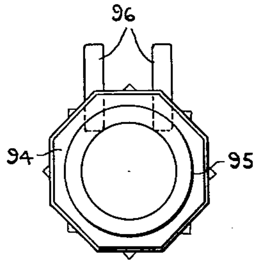
FIGURES 29 and 30 are enlarged front elevational and top plan views respectively of the lamp shaft detent.
Figure 30:
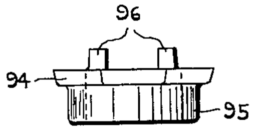

Outwardly of the contact ring at the left end of the sleeve 102 (as viewed in FIGURE 2) is an insulating washer 107, FIGURES 2, 21 and 28, having a tooth 108 that projects downwardly through the cut in the sleeve and abuts against the inner end of the shaft slot 101, the tooth serving to locate the contact ring assembly longitudinally on the shaft. The contact ring at the right end of the sleeve 102 is engaged by a conventional palnut 109 which serves to hold the aforementioned parts in assembled relation and the washer tooth 108 in engagement with the end of the shaft slot.

Since the contact ring assembly is fixed on the shaft 50 and rotates therewith, a pair of substantially U-shaped spring metal contact fingers 110, FIGURES 2, 5, 23 and 24, are arranged to bear against the edges of the rings 105 to deliver current thereto. The fingers 110 are secured as by rivets to an insulating board 111 which rests on shoulders 111*a* formed in the lower housing 35*b* as shown in FIGURE 2. On the underside of the board, the rivets are connected to the ends of a pair of conductors 112, 113, the opposite ends of which are connected to the contact fingers 61 which engage the support shaft contact rings 1 and 4.

The shaft 50 is journalled in nylon bearing sleeves 114 which are mounted in semi-cylindrical openings formed in the vertical end wall 115 and an intermediate vertical wall 116 of the lower housing 35*b*, the upper housing being formed with complementary semi-cylindrical openings in the end wall 117 and intermediate wall 118 to receive the upper portions of the bearing sleeves as indicated in FIGURE 2. The bearing sleeve supported by the intermediate walls 116 and 118 of the housing is held against longitudinal movement by a thrust adjustment palnut 119 which is mounted on the shaft adjacent the insulating washer 107.

The lamp 98 of the searchlight unit 36 is mounted in a housing 120 that engages the end of shaft 50 and is clamped in position thereon by means of a retaining cap 121 which is attached to the housing as by screws (not shown). The lamp housing 120 is prevented from rotating on the shaft by an L-shaped bracket 122 that is secured to the shaft as by spot welding, the upstanding leg of this bracket being positioned between a pair of spaced, parallel ribs 123 formed on the end wall of the housing. The lamp is preferably a 6 or 12 volt sealed beam unit and is retained in the housing by means of a mounting ring 124 which is detachably secured to the housing as by screws 125, an annular gasket 126 being interposed between the lamp and mounting ring as shown.

The mirror 127 is mounted in a housing 128 which is threaded onto the end of the shaft 50 and locked in position by a spring pin 129 that passes through the shaft slot 101 and a diametrically opposed hole 130, FIGURES 5 and 22, the rear end of the mirror housing being formed with a plurality of radial grooves 131 in which the pin is positioned. The mirror is supported in a substantially conventional manner by a back plate 132 that is adjustably mounted on the head of a ball stud 133, the shank of the stud extending into the end of shaft 50 and being retained in position by the pin 129 which passes through a diametral hole therein as indicated in FIGURE 2.

The structural arrangement described above is unusual in that practically none of the components within the motor housing are or need be secured in place by auxiliary fastening means. The upper housing 35*a* is retained in position by 3 screws (not shown) which thread through countersunk holes 134 in the lower housing, FIGURES 4 and 5, into complementary holes (not shown) in the upper housing. When the upper housing has been removed, the shaft 50 can be lifted out of the lower housing taking with it the searchlight and mirror units and other shaft mounted components such as the bearing sleeves 114, worm wheel 81, and contact ring assembly for the lamp current. The motors 51, 52 can then be removed and with each motor will come its conductors and the insulating board 67 that is secured to the other ends of the conductors since the latter simply slides out of its edge retaining grooves 68. Similarly, the insulating board 111 and its contact fingers 110 can be lifted out of the housing together with conductors 112, 113 and the insulating board 67 that is connected thereto. The upper worms 85, 86 mounted on the motor shafts will also be removed with the motors, and this allows the intermediate bearing blocks 87 to be lifted out of the housing. Thereafter, the lower worms 74 and 80 can be lifted out together with the worm wheels 83, 84 mounted on the ends thereof. This leaves nothing in the lower housing except the components mounted on the support shaft 38, and the entire stack of these components can be removed by simply disengaging the upper bearing plate 77 and pushnut 76. Assembling the device, of course, is simply the reverse procedure, and it will be apparent therefore that the invention provides for simplified and very rapid assembly and disassembly as well as a novel structural arrangement.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In an electrically controlled spotlight assembly: a fixed, normally vertical support shaft; a motor housing rotatably mounted on said shaft with a portion of the latter projecting into said housing; a second, normally horizontal shaft rotatably mounted in said housing independently of said support shaft, said second shaft having an end projecting outwardly from one end of the housing; a spotlight unit fixed to said outwardly projecting shaft end for rotation therewith; a pair of independent electric motors in said housing; a first drive train operable by one of said motors to rotate said housing, including said second shaft and spotlight unit, around said fixed support shaft, said first drive train comprising a first worm fixed on the motor shaft, a first worm wheel driven by said first worm, a second worm driven by said first worm wheel, and a second worm wheel fixed on said support shaft and meshing with said second worm; a second drive train operable by said other motor to rotate said second shaft and spotlight unit independently of said housing, said second drive train comprising a first worm fixed on the motor shaft, a first worm wheel driven by said first worm, a second worm driven by said first worm wheel, and a second worm wheel fixed on said second shaft and meshing with said second worm; the second worms of the two drive trains being mounted in said housing in substantially coplanar, parallel relation to one another and the first worms of the two drive trains being mounted in said housing in spaced overlying relation to said second worms at substantially right angles thereto; a plurality of electrical contact rings fixed in stacked relation on said support shaft within said housing; means to deliver current to said rings; and a plurality of contact fingers mounted in said housing for rotation therewith and engaging said rings to deliver current to said motors and spotlight unit.

2. Structure as defined in claim 1 together with a rear-view mirror unit fixed to the other end of said second shaft.

3. Structure as defined in claim 1 including coacting means on each of said shafts and the worm wheel mounted thereon for permitting the worm wheels to rotate relative to the shafts upon the application of a positive rotational force on the exterior of said housing, said coacting means normally holding said worm wheels in fixed relation to the shafts.

4. Structure as defined in claim 1 wherein the second worms of the two drive trains are mounted in bearing supports fixed in said housing, and the first worms of the two drive trains are mounted in removable bearing supports which rest on said fixed bearing supports.

References Cited in the file of this patent

UNITED STATES PATENTS

| | | |
|---|---|---|
| 1,827,797 | Muller | Oct. 20, 1931 |
| 1,833,308 | Russell | Nov. 24, 1931 |
| 2,482,007 | King | Sept. 13, 1949 |
| 2,754,411 | Dohrmann | July 10, 1956 |
| 2,781,882 | Burkhardt | Feb. 19, 1957 |
| 2,817,005 | Cameron | Dec. 17, 1957 |
| 2,859,331 | Grimes | Nov. 4, 1958 |
| 2,898,450 | Tochon | Aug. 4, 1959 |
| 2,921,183 | Fenn et al. | Jan. 12, 1960 |